Sept. 24, 1940.  G. TIERI  2,215,843
ADJUSTABLE SUPPORT FOR DISPLAY MOUNTINGS
Filed March 8, 1938  2 Sheets-Sheet 2
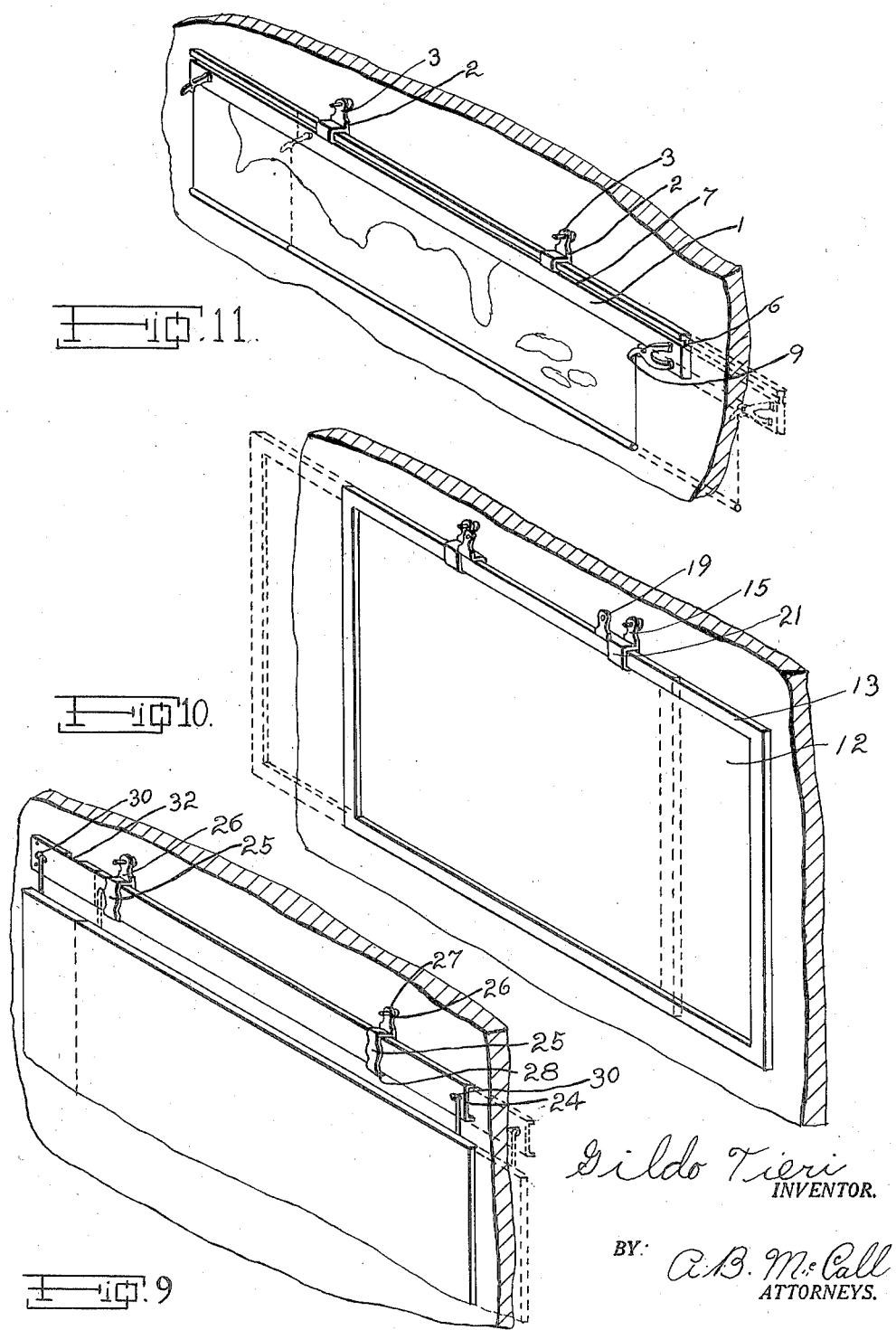

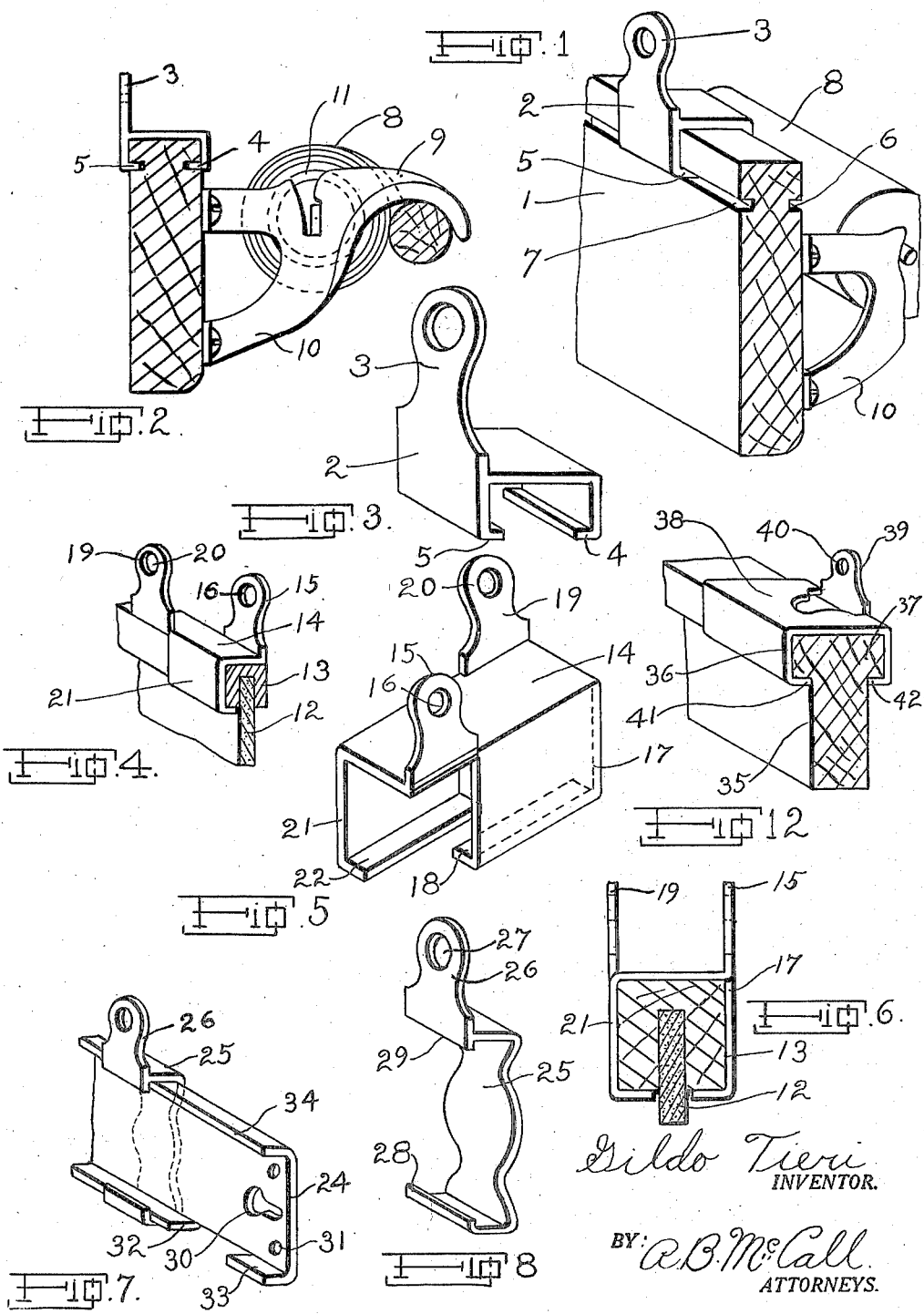

Patented Sept. 24, 1940

2,215,843

UNITED STATES PATENT OFFICE 2,215,843

ADJUSTABLE SUPPORT FOR DISPLAY MOUNTINGS

Gildo Tieri, Chicago Heights, Ill., assignor to Weber Costello Company, Chicago Heights, Ill.

Application March 8, 1938, Serial No. 194,632

3 Claims. (Cl. 248—205)

My invention relates to adjustable supports for display mountings and more especially to supports provided with hanger brackets slidably engaging supports for display mountings.

A purpose of my invention is to provide mountings for displays in operative combination with slidably adjustable supports therefor in the form of suitable hanger brackets which when being attached to a support such as a wall and the like, may be set to any desired spacing apart within the limits of the length of the mounting for the display.

A particular purpose of my invention is to provide means for the adjustable and detachable support of display mountings such as maps, bulletin boards, portable black boards, pictures and the like, wherein a construction is provided that will make it possible to adjust the supporting hanger brackets for the mounting to whatever space apart may be found necessary to secure a solid substantial place in the wall or other support means and thus avoiding difficulties encountered in places where only a certain given space is provided for supporting displays.

I attain the objects of my invention by the modifications thereof described in this specification, and illustrated in the accompanying drawings.

Referring to the drawings:

Fig. 1 is a perspective of the detail of one of the forms of my invention showing a hanger bracket slidably supporting a display mounting for a map.

Fig. 2 is an end view of that form of the invention shown in Fig. 1.

Fig. 3 is a perspective of a detail of that form of hanger bracket shown in Figs. 1 and 2 slidably supporting a display mounting.

Fig. 4 is a perspective of a hanger bracket adapted to slidably engage the frame of a panel or other similar article shown supporting a portion of black board.

Fig. 5 is a perspective of a larger detail of the hanger bracket alone, shown in Fig. 4.

Fig. 6 is a vertical cross section of a detailed portion of the frame handle construction shown in Fig. 4, and illustrating the slidable fitting relation of this hanger bracket as it would appear in an end view.

Fig. 7 is a perspective showing a channel bar whose top and bottom edges are flanges disposed at an approximate right angle to the plane of the body of the channel bar. This figure also shows one of the hanger brackets in its slidably adjustable position on the channel bar.

Fig. 8 is a perspective of one of the hanger brackets shown in use in connection with the channel bar in Fig. 9.

Fig. 9 is a perspective of a display and mounting wherein the hanger brackets are selectively fixed in their space apart on their supporting wall or other support while the channel bar slidably engaged by these brackets is adapted to be detachably secured to the display so that the channel bar may be slidably moved with the display secured thereto.

Fig. 10 is a perspective of a display and mounting shown in a position slidably supported by that form of hanger bracket shown in Figures 4, 5 and 6.

Fig. 11 is a perspective of a display and mounting supported by that form of slidably adjustable hanger bracket shown in Figures 1, 2 and 3.

Fig. 12 is a perspective illustrating a hanger bracket of the channel type shown in Fig. 1 but slidably supporting a display mounting by engaging integral side ribs of the mounting plate.

I shall now point out the salient features of my invention as I explain the details of construction and operation of the several illustrated modifications of my adjustable support for display mountings.

One of the outstanding features of novelty which I am providing in my invention is to be found in its construction which takes care of a much needed convenience in hanging maps, bulletin boards, black boards, charts and displays of numerous kinds.

For instance, when one attempts to hang a map on the wall, or other suitable supporting surfaces, it is often found that where two places of support are necessary the space between them is seldom the same in any two locations, thus presenting a problem wherein the hanger brackets of my invention may be secured to the supporting means with the space between them greater in one situation than another.

With the construction provided in my adjustable support and display mountings, when this problem arises, then the hanger brackets will be secured to the supporting wall or other means at whatever space apart may be necessary within the limits of the length of the mounting for the display to be supported thereby.

Certain modifications of my invention which are thus provided with hanger brackets fixed to a support means with the mounting for the display slidably supported therein, are shown in perspective in Figures 9, 10 and 11.

It shall now be my purpose to point out the details of construction of the several modifications of my invention, as I set forth the description of each:

For instance, as one of the practical forms of my invention, I have devised an adjustable support for display mountings of the style shown in Fig. 1 wherein a mounting rail I is slidably supported by hanger brackets 2, each shaped to define a supporting ear 3 and a pair of oppositely engaging channels 6 and 7 of mounting rail 1 in a slidable manner.

It is not always convenient to locate a suitable solid place on a wall or other support where hanger brackets 2 may be secured, and where this is true, it is found possible with my invention to secure the hanger brackets any desired space apart within the limits of length of the mounting rail 1 and after the hanger brackets 2 are secured into place, then the mounting rail 1 which holds the display map 8 may be slidably adjusted to the desired position of support.

I do not wish to be limited in any way in the application of my adjustable support to holding displays for it is conceivable that it could, in a very practical way hold a black board, a map, a chart, or a picture, if desired; while in connection with such supports, it is desirable to use a mounting rail 1 in most all cases with its detachable display map 8 fixed thereto, with any desired style of holder 9 supporting the display on the mounting rail.

I have shown in the drawings a map 8 held on mounting rail 1 where a pair of brackets 10 hold a roller 11 for its support.

Another modification of my invention is found in Figures 4, 5 and 6, wherein such a display as a bulletin board, black board or chart 12 having a frame member 13 is supported in a slidably adjustable manner by a pair of hanger brackets 14 shaped to define along one side of frame 13 a supporting ear 15 with an aperture 16 and a slidable holding member 17 having an inwardly turned flange 18; while on the other side and integral with the same, I have provided a supporting ear 19 with an aperture 20 and a holding member 21 having an inwardly turned flange 22.

This type of hanger bracket serves as a very substantial and practical slidable support for display charts, black boards, bulletin boards and any other such display devices as may be supported by a frame or rail member which it may slidably engage as is shown in Figures 4, 5 and 6.

It is obvious that the holding members 17 and 21 may be formed into a cylindrical shape to hold a frame or rail that is round, if desired. It will be noted that the supporting ears 15 and 19 are on opposite sides adjacent opposite ends of the hanger brackets, thus to permit a display member supported thereby to be satisfactorily hung either with one surface or the other exposed to view.

It will also be noted that the form of hanger bracket as used is also adapted to be secured to a wall support means with the two supporting hanger brackets set apart as far as it is necessary to space them in order to obtain a desirable solid support for them; while after the hanger brackets 14 are properly secured to the mounting rail or frame slidably engaged thereby, they may be slid over where it will centrally balance in the hanger brackets 14.

It is obvious that this form of hanger bracket is decidedly practical and adaptable for hanging numerous types of displays.

It will be noted in Fig. 7 that I have provided as an additional modification of my invention, a channel bar 24 adapted to be slidably supported by hanger brackets 25 having supporting ears 26 with apertures 27 therein for their attachment. This hanger bracket having at the bottom an upturned flange 28 and at the top a downwardly disposed flange 29, is adapted to encompass channel bar 24 in the manner shown in Fig. 7 and in a way that will permit hanger brackets 25 to be secured to a wall or other suitable support in a selected spaced relation permitting channel bar 24 to serve as a slidably adjustable mounting for the detachable support of a display of charts, maps, bulletin boards, black boards and the like, which may be detachably secured to the respective ends of channel bar 24 through apertures 30 or holes 31.

It will be observed that a notch 32 is cut into lower flange 33 of channel bar 24 or may be cut into upper flange 34 to permit the desired removal of hanger bracket 25 from channel bar 24 any time that it may be needed.

It will be noted in Fig. 12 that a display mounting plate 35 having peripheral flanges or ribs 36 and 37 may be slidably supported by a hanger bracket 38 having a supporting ear 39 with an aperture 40 for slidably engaging flanges 36 and 37 by hanger flanges 41 and 42. This construction thus provides side flanges for the engagement of the display mounting 35 where in Fig. 1 the hanger bracket 2 slidably engages channels on opposite sides of the display plate 1.

It is obvious that minor changes may be made in the construction of certain details of my invention without departing from the spirit and scope thereof and it will be noted that the broad feature of my invention incorporates certain practical forms of an adjustable support for display mountings as shown.

Having thus described the nature of my invention, what I claim is:

1. As a new article of manufacture for the detachable support of maps and comprising a pair of channel brackets adapted to be detachably fixed in horizontal spaced relationship upon a support for displays, and a channel bar slidably supported in said fixed channel brackets, said channel bar provided with terminal slots for the detachable engagement of maps and the like for display.

2. In a supporting device for maps and other displays the combination of a pair of selectively spaced channel brackets detachably secured on a support in horizontal alignment with their open side resting against said support, and a display supporting channel bar selectively slidable in its support in said channel brackets, said channel bar having its open side also disposed along the open side of said channel brackets and provided with supporting apertures adjacent the ends thereof, for the detachable support of displays such as maps and the like.

3. As a new product of manufacture, a map hanger comprising a pair of channel brackets the body of each of which is shaped to define an upper and a lower inwardly turned flange and said upper inwardly turned flange shaped to define also an integral upwardly extending supporting plate having an aperture, said channel brackets thus shaped to be horizontally aligned in selected space relation where solid conditions of support are available and a channel bar having terminal map supporting slots and slidably mounted within said channel brackets for its selectively adjustable support, and said bar having its open side next to said support for said channel brackets.

GILDO TIERI.